United States Patent
Kaneko

(10) Patent No.: US 7,411,330 B2
(45) Date of Patent: Aug. 12, 2008

(54) ROTATING ELECTRIC MACHINE

(75) Inventor: Yutaro Kaneko, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 436 days.

(21) Appl. No.: 11/156,627

(22) Filed: Jun. 21, 2005

(65) Prior Publication Data

US 2005/0285474 A1 Dec. 29, 2005

(30) Foreign Application Priority Data

Jun. 28, 2004 (JP) ............................. 2004-189703

(51) Int. Cl.
 *H02K 21/12* (2006.01)
 *H02K 1/14* (2006.01)
 *H02K 1/18* (2006.01)
(52) U.S. Cl. .................... 310/266; 310/216; 310/254
(58) Field of Classification Search ......... 310/216–217, 310/254, 257, 156.53, 156.56, 261, 265–266, 310/268
See application file for complete search history.

(56) References Cited

U.S. PATENT DOCUMENTS

| | | | | |
|---|---|---|---|---|
| 2,059,518 A | * | 11/1936 | Harley | .................. 310/156.53 |
| 3,700,942 A | * | 10/1972 | Alth | ............................ 310/164 |
| 5,814,914 A | * | 9/1998 | Caamano | ..................... 310/216 |
| 6,043,579 A | * | 3/2000 | Hill | .............................. 310/164 |
| 6,211,593 B1 | | 4/2001 | Nashiki | |
| 6,323,576 B1 | * | 11/2001 | Applegate | .................... 310/268 |
| 6,452,302 B1 | * | 9/2002 | Tajima et al. | ................ 310/216 |
| 6,509,666 B1 | * | 1/2003 | Huang et al. | ................. 310/254 |
| 6,545,382 B1 | | 4/2003 | Bennett | |
| 6,844,656 B1 | | 1/2005 | Larsen et al. | |

FOREIGN PATENT DOCUMENTS

| | | | |
|---|---|---|---|
| CN | 1340238 A | | 3/2002 |
| DE | 199 51 762 A1 | | 5/2000 |
| JP | 2001-069743 A | | 3/2001 |
| JP | 2002-233120 A | | 8/2002 |
| JP | 2003-224942 A | | 8/2003 |
| JP | 2003-274589 A | | 9/2003 |
| JP | 2003-324919 A | | 11/2003 |
| JP | 2004-222492 A | | 8/2004 |
| WO | WO 00/48297 A1 | | 8/2000 |

* cited by examiner

*Primary Examiner*—Tran Nguyen
(74) *Attorney, Agent, or Firm*—Foley & Lardner LLP

(57) ABSTRACT

A rotating electric machine is comprised of a stator having a stator core and a stator coil wound around the stator core, the stator core having at least two tip portions, and a rotor having a rotor core and a plurality of permanent magnets provided in the rotor core, the rotor being rotatable relative to the stator. A direction of flux of the permanent magnets is perpendicular to a direction of an array of the stator, and the tip portions of the stator core sandwich the rotor and are disposed to be nearer to the rotor than the stator coil.

15 Claims, 6 Drawing Sheets

ROTATING ELECTRIC MACHINE

BACKGROUND OF THE INVENTION

The present invention relates a rotating electric machine which comprises a rotor having a rotor core and permanent magnets disposed in the rotor core and a stator having a stator core and a stator coil wound around the stator core, and which is arranged such that the rotor is rotatably provided relative to the stators with an air gap.

A rotating electric machine of a type that a rotor is constructed by embedding a permanent magnet therein has been widely used, for the reason that such a type performs a high efficiency due to a small loss and a high output performance.

Japanese Published Patent Application No. 2002-233120 discloses such a type of a rotating electric machine which is constructed by specifically formed rotor and stator so as to further decrease the size of the machine and to improve a torque generation performance.

SUMMARY OF THE INVENTION

However, since the flux flow of the stator is closed in each stator coil due to the structural limitation of such a type of the rotating electric machine, a rotational flux is not produced. This affects the rotating electric machine used in an electric rotating machine of generating continuously revolution so as to increase a torque fluctuation and to lower an output thereof.

It is therefore an object of the present invention to provide an improved electric rotating machine which is capable of suppressing a torque fluctuation and of increasing a torque and an output thereof even when used as a continuous revolution generating machine.

An aspect of the present invention resides in a rotating electric machine which comprises a stator having a stator core and a stator coil wound around the stator core; and a rotor having a rotor core and a plurality of permanent magnets embedded in the rotor core, a direction of flux of the permanent magnets being perpendicular to a direction of an array of the stator at least two surfaces of each permanent magnet being faced with the stator through an air gap.

Another aspect of the present invention resides in a rotating electric machine which comprises a stator having a stator core and a stator coil wound around the stator core, the stator core having at least two tip portions; and a rotor having a rotor core and a plurality of permanent magnets provided in the rotor core, the rotor being rotatable relative to the stator; wherein a direction of flux of the permanent magnets is perpendicular to a direction of an array of the stator, and the tip portions of the stator core sandwich the rotor and are disposed to be nearer to the rotor than the stator coil.

The other objects and features of this invention will become understood from the following description with reference to the accompanying drawings.

DETAILED DESCRIPTION OF THE INVENTION

Figure 1:
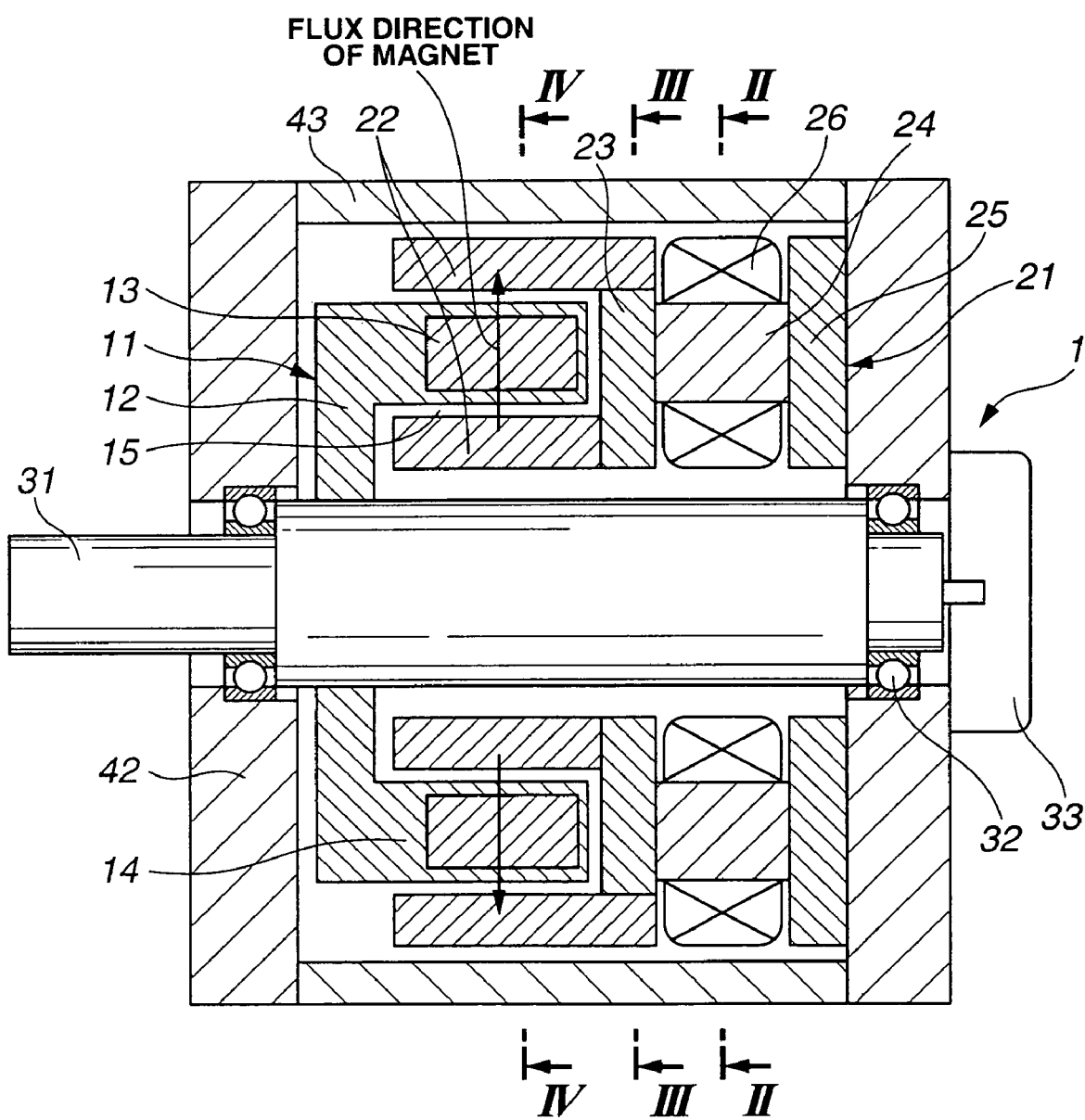
FIG. 1 is a cross sectional view showing a rotating electric machine according to a first embodiment of the present invention.

Referring to FIGS. 1 through 4, there is discussed a rotating electric machine 1 according to a first embodiment of the present invention. FIG. 1 is a schematic view showing an axial directional cross section of rotating electric machine 1 according to a first embodiment of the present invention.

Figure 2:
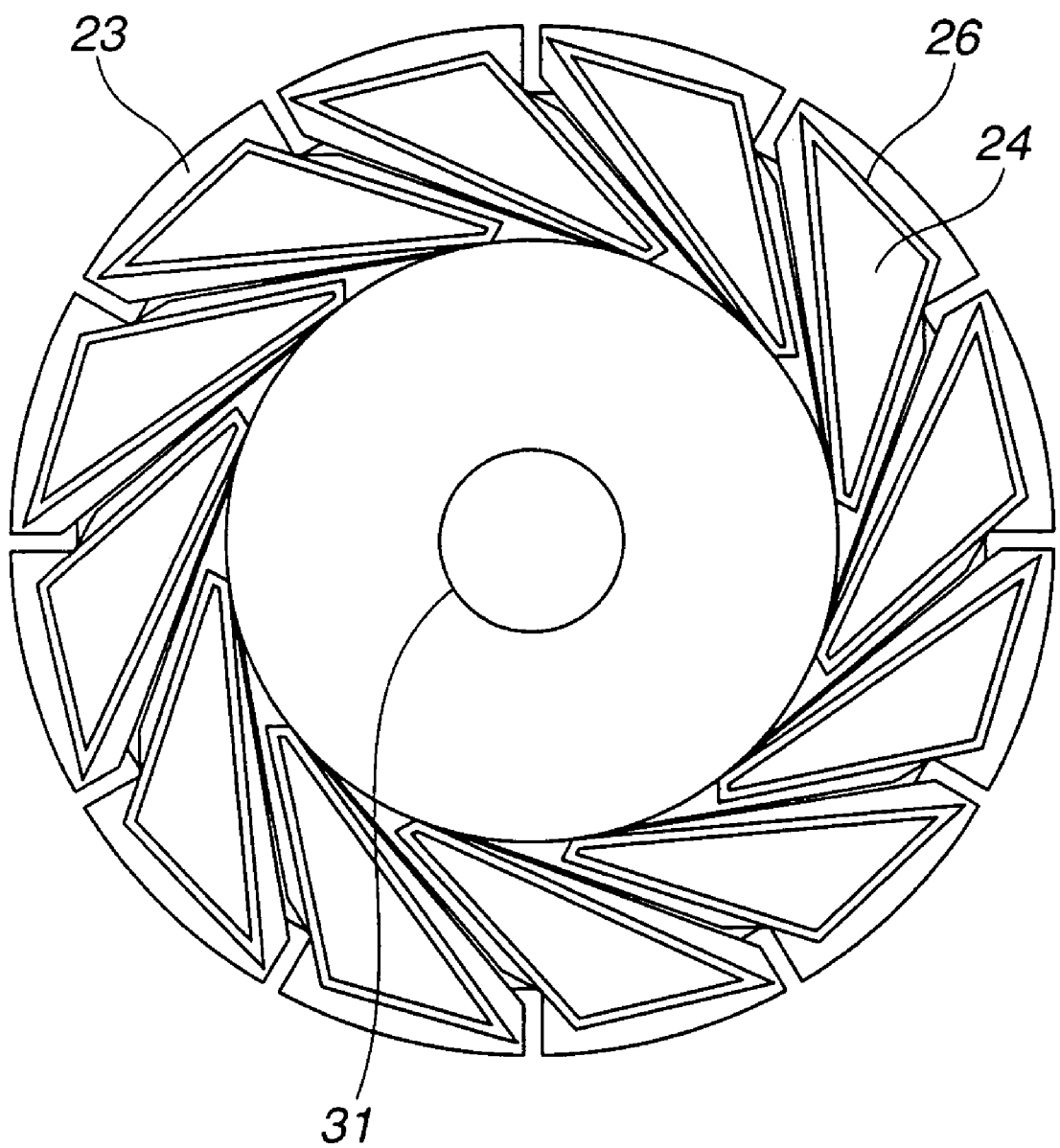
FIG. 2 is a cross sectional view taken on the line II-II of FIG. 1 in the direction of the arrows.
Figure 3:
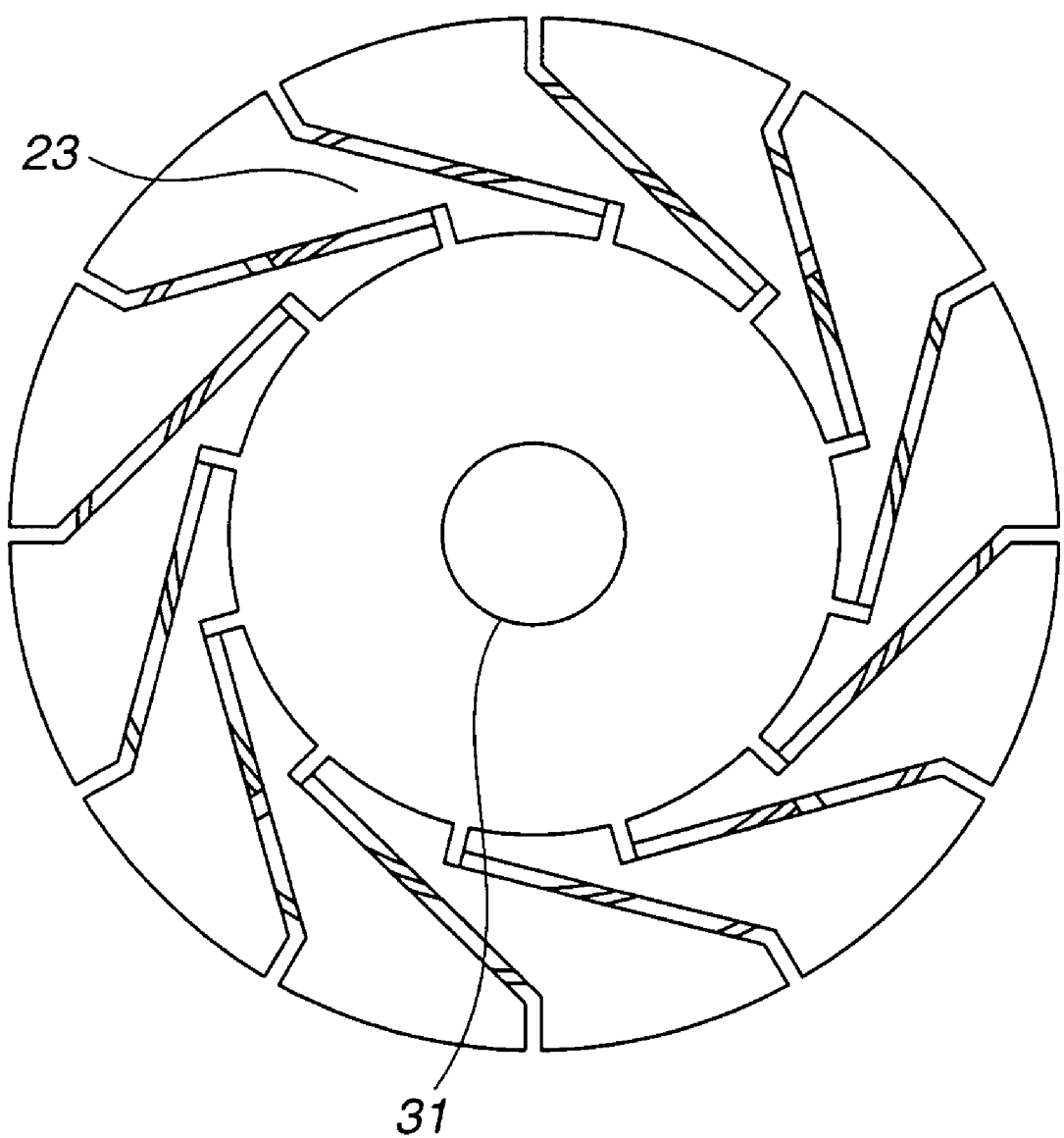
FIG. 3 is a cross sectional view taken on the line III-III of FIG. 1 in the direction of the arrows.
Figure 4:
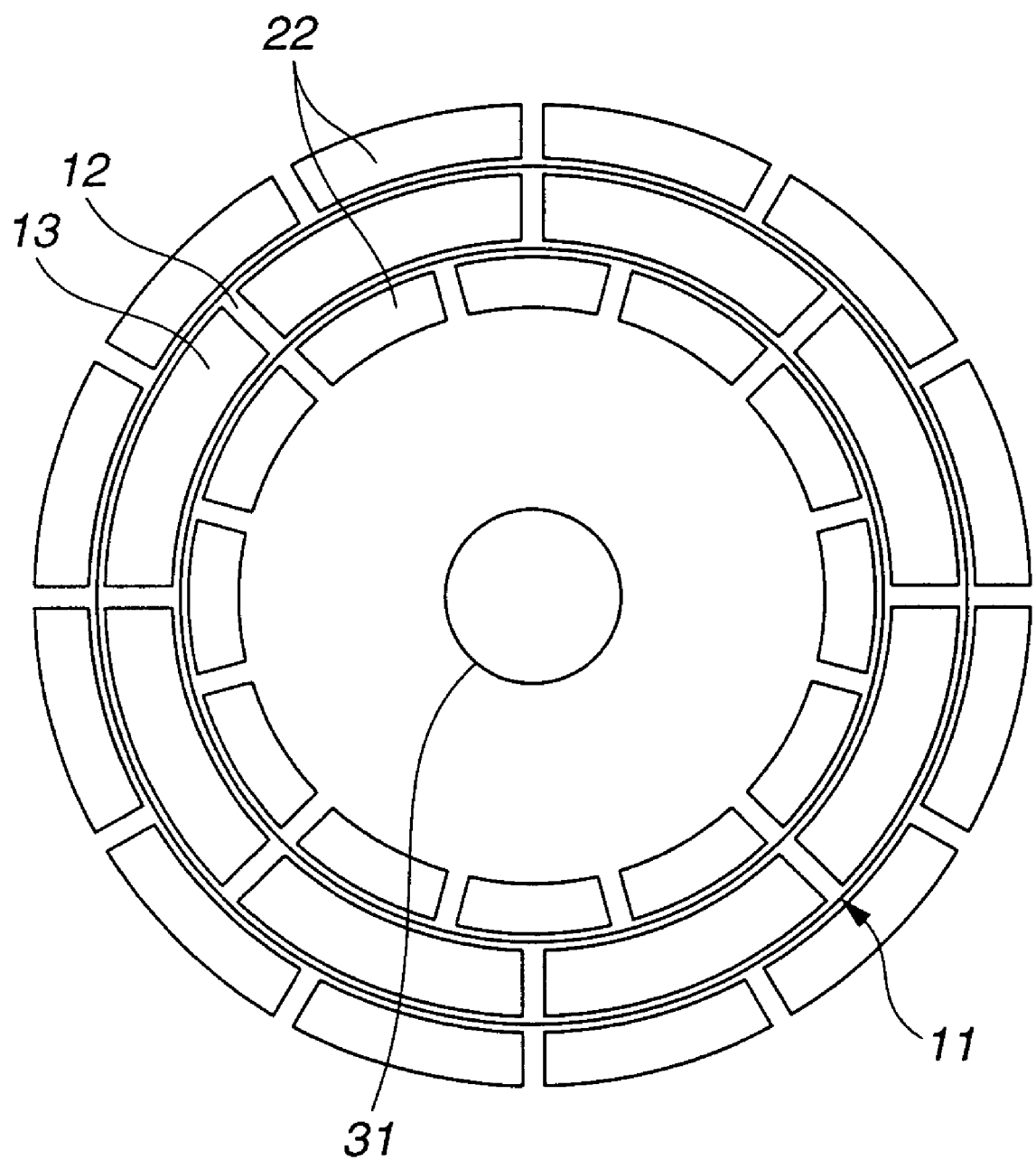
FIG. 4 is a cross sectional view taken along the line IV-IV of FIG. 1 in the direction of the arrows.

In order to facilitate a state of each element, rotating electric machine 1 of FIG. 1 is schematically represented. FIG. 2 is a cross sectional view taken on the line II-II of FIG. 1 as viewed in the direction of the arrows. FIG. 3 is a cross sectional view taken on the line III-III of FIG. 1 as viewed from the direction of the arrows. FIG. 4 is a cross sectional view taken on the line IV-IV of FIG. 1 as viewed from the direction of the arrows.

As shown in FIGS. 1 through 4, rotating electric machine 1 comprises a rotor 11, a stator 21, a rotation shaft 31 and a casing 41. Rotor 11 has a rotor core 12 and a plurality of permanent magnets 13 provided in rotor core 12. The number of permanent magnets 13 denotes the number of poles of rotor 11. As shown in FIG. 4, there are provided 8 permanent magnets 13 circumferentially around rotation shaft 31, and therefore rotating electric machine 1 of the first embodiment is of a 8-pole type. That is, the array of permanent magnets 13 are circular around rotation shaft 31. Permanent magnets 13 are provided in a cylindrical tip portion of rotor core 12 and constructs a rotor projecting portion 14.

A direction of flux of permanent magnets-13 is directed in the diametrical direction of rotating electric machine 1 as shown by an arrow in FIG. 1. That is, in this first embodiment, the direction of the flux of permanent magnets 13 is a radial direction extending from the center of rotating electric machine 1 and is perpendicular to the rotational axis of rotating shaft 31. Stator 21 comprises a stator core 30 and a stator coil 26. More specifically, stator 21 is constructed by 12 stator elements which are circumferentially disposed around the rotation shaft 31 as shown in FIGS. 1 through 4. That is, an array of the stator elements of stator 21 is circular around rotation shaft 31. Each stator element has stator core 30 and stator coil 26, and the aggregation of the stator elements constructs stator 21. Stator core 30 is constructed by two stator core tip portions 22, a stator core connecting portion 23, a stator coil core 24 and a stator back core 25. Two stator core tip portions 22 are provided in parallel with a predetermined space therebetween, and one end of each stator core tip portion 22 is connected to stator core connecting portion 23. Stator coil 26 is wound around stator coil core 24 of stator core 31. Casing 41 has two side casings 42 provided at both end portions of rotating electric machine 1, respectively and a circumferential casing 43 of a cylindrical shape. Stator 21 is supported by side casing 43 through stator back core 25. Rotor 11 is connected to rotation shaft 31 and is supported by side casings 43 through rotation shaft 31 and bearings 32. A rotation sensor 31 is attached to an end of rotation shaft 31.

Rotating electric machine 1 of the first embodiment is arranged such that permanent magnets 13 of rotor 11 generate a reaction force against rotational flux produced by stator 21, and rotor 11 rotates around rotation shaft 31 due to the reaction force. Permanent magnets 13 are disposed such that a direction of magnetic pole of each permanent magnet 13 is different from the directions of magnetic poles of adjacent two permanent magnets 13 disposed at both adjacent sides of the each permanent magnet 13. A clearance called an air gap is formed between rotor 11 and stator 21 so that rotor 11 and stator are not in contact with each other. More specifically, at least two surfaces of each permanent magnet 13 are faced with stator 21 through the air gap.

Rotating electric machine 1 of the first embodiment is arranged such that rotor core 12 is constructed by a laminate of a plurality of electromagnetic steel plates. The stator core, which includes stator core tip portions 22, stator core connecting portion 23, stator coil core 24, and stator back core 25, is a pressed power core. As shown in FIG. 1, permanent magnets 13 are arranged such that the direction of flux of each permanent magnet 13 is directed along the diametrical direction of rotation shaft 31, and stators 21 are arranged along the axial direction which is perpendicular to the direction of flux of permanent magnets 13. Further, as shown in FIGS. 1 through 4, stator core tip portions 22 of stator core 30 are arranged such that rotor projecting portion 14 is sandwiched between stator core tip portions 22 with air gaps. As shown in FIG. 1, stator core tip portions 22 are connected to stator core connecting portion 23 which is located at a tipper side than a position of stator coil 26 and is connected to other stator cores through stator coil core 24 and stator back core 25. In other words, stator core tip portions 22 are disposed to be nearer that rotor 11 than stator coil 26. As shown in FIGS. 3 and 4, branched stator core tip portions 22 are arranged such that an outer one of stator core tip portions 22 is shifted from an inner one of stator core tip portions 22 by an angle corresponding to one pole of the outer and inner portions of permanent magnet 13. Stator core connecting portion 23 is inclined.

With this arrangement of rotating electric machine 1 according to the first embodiment of the present invention, the flux of the same pole penetrate the respective stator core tip portions 22 and the leakage of the flux from permanent magnet 13 is decreased. Therefore, it becomes possible to increase the torque and output of rotating electric machine 1. Further since each stator 21 is magnetically connected to other stators 21, the rotational flux is produced and the stable rotation is achieved thereby.

Figure 5:
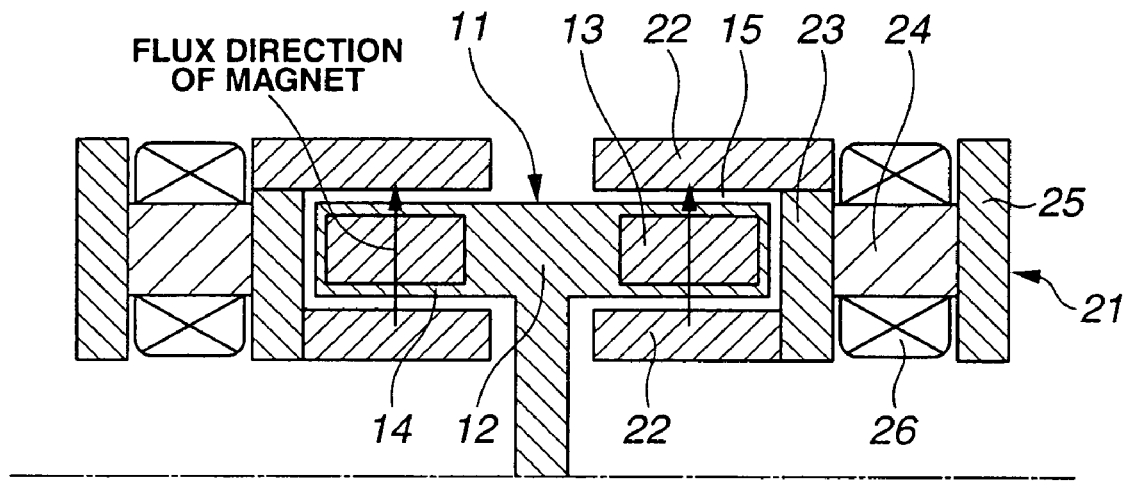
FIG. 5 is a cross sectional view partially showing the rotating electric machine according to a second embodiment of the present invention.

FIG. 5 is a partial cross sectional view of rotating electric machine 1 according to a second embodiment of the present invention. In FIG. 5, elements as same as those shown in FIGS. 1 through 4 are denoted by the same reference numerals and the explanation thereof is omitted herein. Rotating electric machine 1 shown in FIG. 5 is constructed such that rotor 11 is formed in the shape of character T in cross section including a center axis of rotating electric machine 1, and each rotor element per each pole of rotor 11 has a plurality of permanent magnets 13. Herein, each rotor element of rotor 11 has two permanent magnets 13. More specifically, as shown in FIG. 5, rotor core 12 is constructed such that a disc-shaped member is connected to rotation shaft, that a center portion of a cylindrical member is connected to an outer periphery of the disc-shaped member, and that permanent magnets 13 are embedded in both end portions of the cylindrical member. That is, each rotor element of rotor 11 has two permanent magnets 13. Two stators 21 are disposed along the axial direction. Two rotor projecting portions 14, which extend along the axial direction of rotating electric machine 1, are respectively sandwiched by stator core tip portions of two stators 21. This arrangement further increases the flux of permanent magnets 13, and therefore the torque and output of rotating electric machine 1 are further increased.

Figure 6:
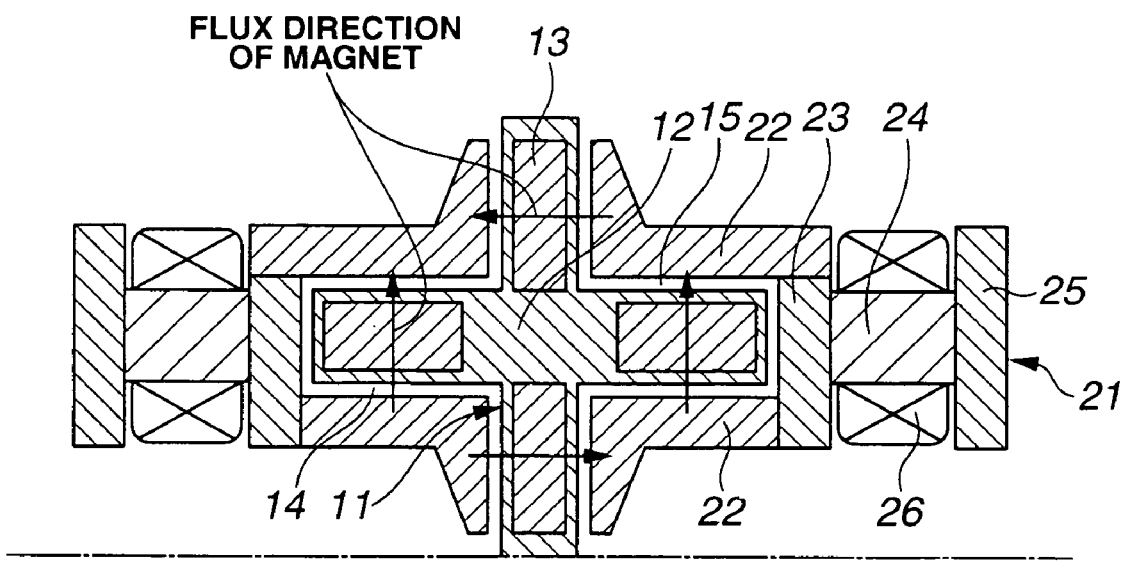
FIG. 6 is a cross sectional view partially showing the rotating electric machine according to a third embodiment of the present invention.

FIG. 6 is a partial cross sectional view of rotating electric machine 1 according to a third embodiment of the present invention. In FIG. 6, elements as same as those shown in FIGS. 1 through 4 are denoted by the same reference numerals and the explanation thereof is omitted herein. Rotating electric machine 1 shown in FIG. 6 is constructed such that rotor 11 is formed in the shape of a cross shape in cross section including the center axis of rotating electric machine 1, and each rotor element per each pole of rotor 11. Herein, each rotor element of rotor 11 has a plurality of permanent magnets 13, and each element has four permanent magnets 13. Two stators 21 are disposed along the axial direction. Two rotor projecting portions 14, which extend along the axial direction, are respectively sandwiched by stator core tip portions 22 of two stators 21. Further, a top end of each inner stator core tip portion 22 extends inwardly toward the center axis so as to sandwich magnets 13 embedded in inner side portions of the disc-shaped member of rotor core 11. Similarly, a top end of each outer stator core tip portion 22 extends outwardly so as to sandwich permanent magnets 13 embedded in outer side portions of the disc-shaped member of rotor core 11. This arrangement further increases the flux of permanent magnets 13, and therefore the torque and output of rotating electric machine 1 are further increased.

Figure 7:
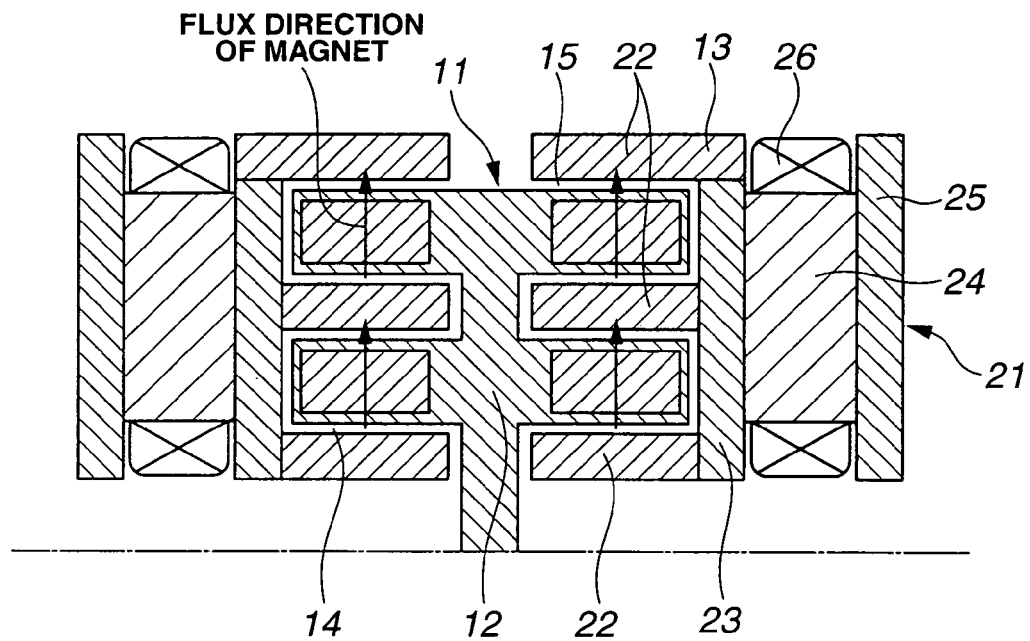
FIG. 7 is a cross sectional view partially showing the rotating electric machine according to a fourth embodiment of the present invention.

FIG. 7 is a partial cross sectional view of rotating electric machine 1 according to a fourth embodiment of the present invention. In FIG. 7, elements as same as those shown in FIGS. 1 through 4 are denoted by the same reference numerals and the explanation thereof is omitted herein. Rotating electric machine 1 of the fourth embodiment is arranged such that rotor 11 has a plurality of rotor projecting portions 14. More specifically, as is clearly shown in FIG. 7, rotor core 12 is constructed by a disc-shaped member connected to rotation shaft 31 and inner and outer cylindrical members. each center portion of each inner and outer cylindrical members are integrally connected to the disc-shaped member, and that permanent magnets 13 are embedded in both end portions of each of the inner and outer cylindrical members. That is, each rotor element of rotor 11 has four permanent magnets 13. Herein, there are provided two rotor projecting portions 14. Stator core tip portions 22 are branched into three tips to properly sandwich two rotor projecting portions 14. Three stator core tip portions 22 are integrally connected to stator core connecting portion 23 and further connected to stator core coil 24 and stator back core 25. This arrangement further increases the flux of permanent magnets 13, and therefore the torque and output of rotating electric machine 1 are further increased.

Figure 8:
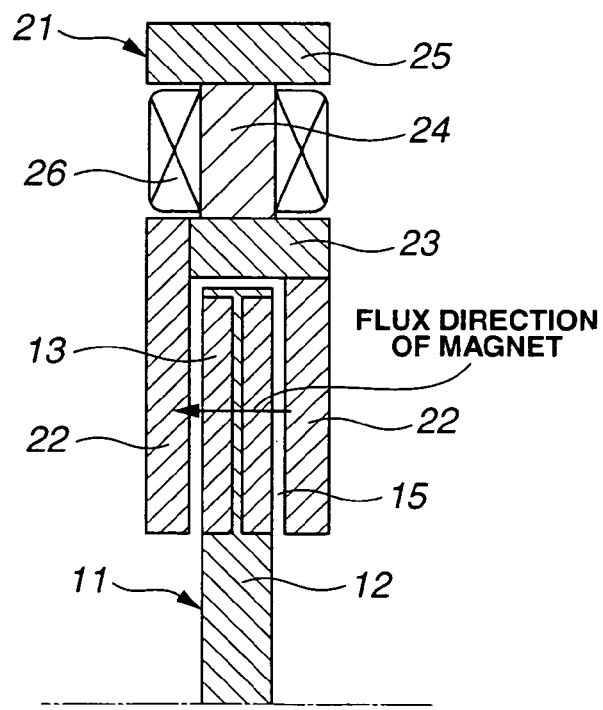
FIG. 8 is a cross sectional view showing the rotating electric machine according to a fifth embodiment of the present invention.

FIG. 8 is a partial cross sectional view of rotating electric machine 1 according to a fifth embodiment of the present invention. In FIG. 8, elements as same as those of the first embodiment are denoted by the same reference numerals, and the explanation thereof is omitted herein. The flux direction of permanent magnets 13 is along the axial direction of rotating electric machine 1, and stator coils 26 are circumferentially arranged. Since rotor 11 and stator 21 are circumferentially arranged, it becomes possible to decrease the thickness of rotating electric machine 1.

This application is based on Japanese Patent Application No. 2004-189703 filed on Jun. 28, 2004 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. For example, the embodiments have been discussed as to the rotating electric machine, the invention may be applied to an electric motor and a generator. Further although the embodiments have been shown and described that the rotating electric machine is of 8 pole type, the other pole type may be employed. Although the embodiments of the invention have been shown and described such that the rotating electric machine has 12 slots per 8 poles, 6 slots per 8 poles may be employed. Further although the embodiments of the invention have been shown and described such that the rotor core is made from electromagnetic steel, it may be made by pressed power core. Although the number of the rotor core projecting portions are one or two, it may be greater than two. Furthermore, the embodiments of the invention have been shown and described such that rotating electric machine is constructed by one rotor and one stator or constructed by one rotor and two stators, it may be constructed by two rotor and one stator, by two rotors and three stators, by three rotors and two stators, or by other combination. The scope of the invention is defined with reference to the following claims.

What is claimed is:

1. A rotating electric machine comprising:
   a stator having a stator core and a stator coil wound around the stator core, the stator core having at least two tip portions; and
   a rotor having a rotor core and a plurality of permanent magnets provided in the rotor core, the rotor being rotatable relative to the stator;
   wherein at least two surfaces of each permanent magnet which correspond to both Doles of each permanent magnet face the stator through an air gap, and the at least two tip portions of the stator core sandwich the rotor and are connected integrally with each other on a side of the stator that corresponds to a side at which the at least two tip portions are positioned as distinguished from another side at which the stator coil is positioned.

2. The rotating electric machine as claimed in claim 1, wherein the at least two stator core tip portions are arranged such that an outer one of the at least two tip portions is shifted from an inner one of the at least two tip portions by an angle corresponding to one pole of the rotor.

3. The rotating electric machine as claimed in claim 1, wherein each pole of the rotor is constructed by the plurality of permanent magnets.

4. The rotating electric machine as claimed in claim 1, wherein the rotor includes a disc-shaped member and a cylindrical member having one end connected to an outer periphery of the disc-shaped member.

5. The rotating electric machine as claimed in claim 1, wherein the rotor includes a disc-shaped member and a cylindrical member having a center portion connected to an outer periphery of the disc-shaped member.

6. The rotating electric machine as claimed in claim 1, wherein the rotor includes a disc-shaped member and a cylindrical member having a center portion connected to a diametrically intermediate portion of the disc-shaped member.

7. The rotating electric machine as claimed in claim 1, wherein the rotor includes a disc-shaped member and inner and outer cylindrical members having center portions connected to a diametrically intermediate portion and an outer peripheral portion of the disc-shaped member, respectively.

8. The rotating electric machine as claimed in claim 1, wherein the stator includes a plurality of stators for the rotor.

9. The rotating electric machine as claimed in claim 1, wherein the stator comprises a plurality of stator cores and a plurality of stator coils, the plurality of stator cores being constructed by two first stator core tip portions, a first stator core connecting portion, a first stator coil core and a first stator back core, the two first stator core tip portions being provided in parallel with a predetermined space therebetween, and one end of each of the first stator core tip portions being connected through the first stator core connecting portion to the first stator coil core around which the stator coil is wound.

10. A rotating electric machine comprising:
    a stator having a stator core and a stator coil wound around the stator core, the stator core having at least two tip portions; and
    a rotor having a rotor core and a plurality of permanent magnets provided in the rotor core, the rotor being rotatable relative to the stator;
    wherein a direction of flux of the permanent magnets is perpendicular to a direction of an array of the stator, and the at least two tip portions of the stator core sandwich the rotor and are disposed to be nearer to the rotor than the stator coil, and wherein the rotor includes a disc-shaped member and inner and outer cylindrical members having center portions connected to a diametrically intermediate portion and an outer peripheral portion of the disc-shaped member, respectively.

11. The rotating electric machine as claimed in claim 10, wherein at least two surfaces of each permanent magnet which correspond to both poles of each permanent magnet face the stator through an air gap.

12. The rotating electric machine as claimed in claim 10, wherein the at least two tip portions of the stator core are connected integrally with each other on a side of the stator that corresponds to a side at which the at least two tip portions are positioned as distinguished from a side at which the stator coil is positioned.

13. A rotating electric machine comprising:
    a stator having a stator core and a stator coil wound around the stator core, the stator core having at least two tip portions; and
    a rotor having a rotor core and a plurality of permanent magnets provided in the rotor core, the rotor being rotatable relative to the stator;
    wherein a direction of flux of the permanent magnets is perpendicular to a direction of an array of the stator, and the at least two tip portions of the stator core sandwich the rotor and are disposed to be nearer to the rotor than the stator coil, and wherein the stator comprises a plurality of stator cores and a plurality of stator coils, the plurality of stator cores being constructed by two first stator core tip portions, a first stator core connecting portion, a first stator coil core and a first stator back core, the two first stator core tip portions being provided in parallel with a predetermined space therebetween, and one end of each of the first stator core tip portions being connected through the first stator core connecting portion to the first stator coil core around which the stator coil is wound.

14. The rotating electric machine as claimed in claim 13, wherein at least two surfaces of each permanent magnet which correspond to both poles of each permanent magnet face the stator through an air gap.

15. The rotating electric machine as claimed in claim 13, wherein the at least two tip portions of the stator core are connected integrally with each other on a side of the stator that corresponds to a side at which the at least two tip portions are positioned as distinguished from a side at which the stator coil is positioned.

* * * * *